United States Patent
Song et al.

(10) Patent No.: US 9,621,949 B2
(45) Date of Patent: Apr. 11, 2017

(54) METHOD AND APPARATUS FOR REDUCING LATENCY IN MULTI-MEDIA SYSTEM

(71) Applicants: Bing Song, Shanghai (CN); Xiaowen Liu, Shanghai (CN); Zening Wang, Nanjing (CN)

(72) Inventors: Bing Song, Shanghai (CN); Xiaowen Liu, Shanghai (CN); Zening Wang, Nanjing (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/677,960

(22) Filed: Apr. 2, 2015

(65) Prior Publication Data

US 2016/0134931 A1    May 12, 2016

(30) Foreign Application Priority Data

Nov. 12, 2014   (CN) .......................... 2014 1 0833214

(51) Int. Cl.
| | | |
|---|---|---|
| G09G 5/00 | (2006.01) | |
| H04N 21/44 | (2011.01) | |
| H04N 21/442 | (2011.01) | |
| H04N 21/43 | (2011.01) | |
| H04N 19/172 | (2014.01) | |
| H04N 19/132 | (2014.01) | |
| H04N 19/152 | (2014.01) | |
| H04N 19/436 | (2014.01) | |

(52) U.S. Cl.
CPC ..... *H04N 21/44004* (2013.01); *H04N 19/132* (2014.11); *H04N 19/152* (2014.11); *H04N 19/172* (2014.11); *H04N 19/436* (2014.11); *H04N 21/4307* (2013.01); *H04N 21/4424* (2013.01)

(58) Field of Classification Search
CPC .................................................. H04N 21/2401
USPC ........................................................ 345/2.3
See application file for complete search history.

(56) References Cited

U.S. PATENT DOCUMENTS

| | | | |
|---|---|---|---|
| 6,072,809 A | 6/2000 | Agrawal et al. | |
| 6,115,357 A | 9/2000 | Packer et al. | |
| 6,665,728 B1 | 12/2003 | Graumann et al. | |
| 6,999,921 B2 | 2/2006 | Harris et al. | |
| 7,035,210 B2 | 4/2006 | Walles | |
| 7,924,711 B2 | 4/2011 | Rosen | |
| 2006/0149850 A1* | 7/2006 | Bowman ................ | G11B 27/10 709/231 |
| 2008/0172441 A1* | 7/2008 | Speicher ............. | H04L 12/2838 709/201 |
| 2009/0059962 A1* | 3/2009 | Schmidt ................ | H04J 3/0667 370/503 |
| 2010/0091769 A1* | 4/2010 | Magliaro ................ | G10L 19/24 370/352 |

(Continued)

*Primary Examiner* — Michael Hong
(74) *Attorney, Agent, or Firm* — Charles E. Bergere

(57) ABSTRACT

A sink apparatus for receiving and playing back multimedia data receives data frames and discards data frames from its processing pipeline in order to reduce latency if it is determined that an amount of media data buffered in one or more portions of the processing pipeline during a fixed playback time period is above a threshold value. The threshold value and therefore the extent to which data frames are discarded can be varied in order to balance latency and quality of the displayed multimedia data.

14 Claims, 3 Drawing Sheets

(56) References Cited

U.S. PATENT DOCUMENTS

| | | | | |
|---|---|---|---|---|
| 2013/0148940 A1* | 6/2013 | Schmit | ............. | G11B 27/005 386/230 |
| 2013/0222699 A1* | 8/2013 | Wang | ............. | H04N 21/4307 348/719 |
| 2013/0262694 A1* | 10/2013 | Swaminathan | ..... | H04L 65/4084 709/231 |
| 2014/0269942 A1* | 9/2014 | Mikov | ............. | H04N 19/172 375/240.27 |

* cited by examiner

METHOD AND APPARATUS FOR REDUCING LATENCY IN MULTI-MEDIA SYSTEM

BACKGROUND OF THE INVENTION

The present invention relates generally to processing of multimedia data (such as audio and/or video) and, more particularly, to reducing end to end latency of data transmitted from a source device to a sink device.

A typical wireless display (WD) system includes a source device and one or more sink devices. The source device and each of the sink devices may comprise, for example, a mobile telephone, tablet computer, laptop computer, portable media player, or a so-called "smart" phone or tablet, each with the capability to replay audio data and/or display video information on a display to the user. Usually, the source device sends multimedia data to one or more sink devices participating in a particular communication session whereupon the media data is buffered at the sink end and then played back to a user. Latency, in general, is a period of delay between a signal entering and exiting a system. A high latency can detract from the user experience and a low latency is a particular requirement for voice and video over IP systems, video conferencing and wireless display systems. Sink-end buffering is a contributor to end-to-end latency. Thus, it would be advantageous to provide a sink device with a reduced latency.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
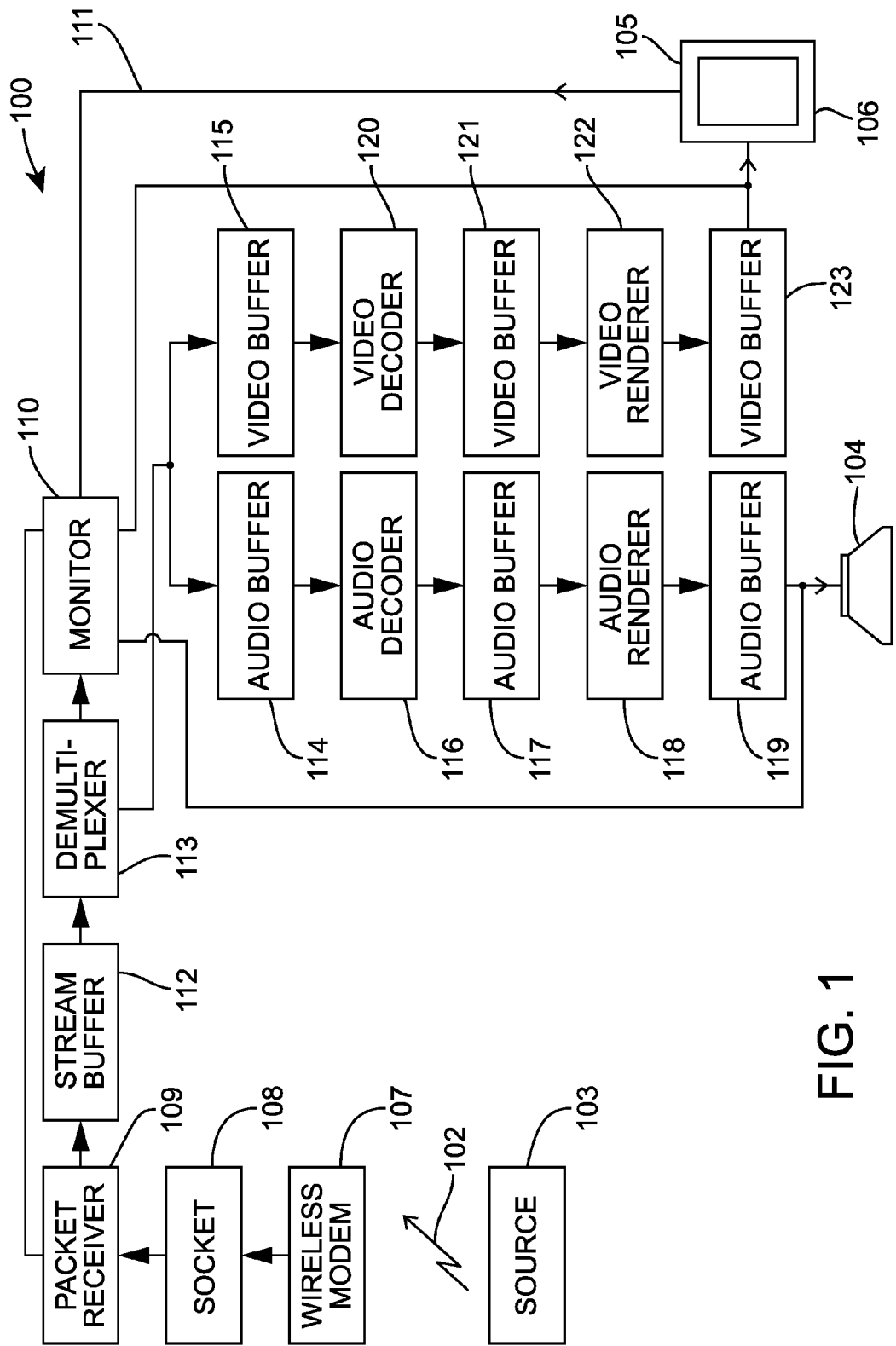
FIG. 1 is a schematic block diagram of a wireless display system comprising a sink apparatus in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method for adjusting latency in a sink apparatus, where the sink apparatus receives media data from a source apparatus for play back, and includes a processing pipeline. The method comprises the steps of: in the sink apparatus, monitoring an amount of media data buffered in at least a portion of the processing pipeline; comparing the monitored amount of data with a predetermined threshold value; and if the monitored amount of data exceeds the predetermined threshold value, discarding the media data from the processing pipeline until the monitored amount falls below the predetermined threshold value.

In another embodiment, the present invention provides a sink apparatus capable of receiving media data from a source apparatus for play back. The sink apparatus comprises a processing pipeline and a monitor. The monitor monitors an amount of media data buffered in at least a portion of the processing pipeline, compares the monitored amount of media data with a predetermined threshold value, and if the monitored amount of media data exceeds the predetermined threshold value, discards the media data from the processing pipeline until the monitored amount falls below the predetermined threshold value.

In one embodiment, an amount of buffered media data is determined by comparing timestamp values assigned to media data packets at different locations of the processing pipeline.

Referring now to FIG. 1, a sink apparatus 100 that receives multimedia data over a wireless link 102 from a remote source 103 in accordance with an embodiment of the present invention is shown. The components of the sink apparatus 100 constitute a wireless display (WD) system.

The sink apparatus 100 includes a user display, which comprises a speaker 104 and a visual display device 105 having a touch screen 106. The speaker 104 reproduces audio data received by the sink apparatus 100 from the source 103 and the touch screen 106 displays video data received by the sink apparatus 100 from the source 103. The sink apparatus 100 includes other components and it will be appreciated that the illustrated components of FIG. 1 constitute just one example configuration for a wireless display system. It will also be appreciated that in other embodiments, the speaker 104 can be replaced by any of a variety of audio output devices such as headphones or a single or multi-speaker system. Similarly, in other embodiments, the display device 105 can comprise one of a variety of video output devices such as a cathode ray tube (CRT), a liquid crystal display (LCD), a plasma display, a light emitting diode (LED) display, an organic light emitting diode (OLED) display, or another type of display device including a user input means such as a push button or capacitive or resistive sensor in the case of a touch screen or any other type of input device, like a keyboard, either virtual or real, or a sensor driven input device. In other examples, the sink apparatus 100 can be a single device, such as a tablet computer or smartphone.

The sink apparatus 100 also includes a wireless modem 107 that receives an RF signal carrying (streamed) multimedia data packets (which may be arranged in data frames) from the source 103 and which is operably coupled to a socket 108 that in turn, is operably coupled to a packet receiver 109. A first output of the packet receiver 109 is operably coupled to a monitor 110. The monitor 110 also receives an input from the visual display device 105 on a line 111. A second output of the packet receiver 109 is operably coupled to a stream buffer 112. An output of the stream buffer 112 is operably coupled to an input of a de-multiplexer 113. A first output of the de-multiplexer 113 is operably coupled to the monitor 110. A second output of the de-multiplexer 113 is operably coupled to a first audio buffer 114 and a first video buffer 115.

An output of the first audio buffer 114 is operably coupled to an audio decoder 116, and an output of the audio decoder 116 is operably coupled to an input of a second audio buffer 117. An output of the second audio buffer 117 is operably coupled to an input of an audio renderer 118. An output of the audio renderer 118 is operably coupled to an input of a third audio buffer 119. An output of the third audio buffer 119 is operably coupled to the speaker 104 and to the monitor 110.

An output of the first video buffer 115 is operably coupled to a video decoder 120. An output of the video decoder 120 is operably coupled to an input of a second video buffer 121. An output of the second video buffer 121 is operably coupled to an input of a video renderer 122. An output of the video renderer 122 is operably coupled to an input of a third video buffer 123. An output of the third video buffer 123 is operably coupled to the visual display device 105 and the monitor 110. In one embodiment, the audio and video renderers 118, 122 are operably coupled to the monitor 110. The monitor 110 can also send instructions to the audio and video decoders 116, 120, the renderers 118, 122 and first, second and third audio and video buffers 114, 117, 119, and 115, 121, and 123.

The source 103 and the sink apparatus 100 establish a communication session according to any protocol (a description of the specific protocol is not necessary for a complete understanding of the invention) and then they communicate over the wireless link 102 using a conventional communications protocol. In the example of FIG. 1, audio and video data that are transmitted from the source 103 to the sink apparatus 100 include multimedia content such as movies, television shows, or music and can also include real-time content generated by the source 103. The audio and video data is encoded at the source 103 and typically transmitted in the form of data packets and video frames.

The packet receiver 109 typically includes conventional mixers, filters, amplifiers and other components designed for signal demodulation. The wireless link 102 in one embodiment is a short-range communication channel, similar to Wi-Fi, Bluetooth®, or the like. In other examples, the wireless link 102 forms part of a packet-based network, such as a wired or wireless local area network, a wide-area network, or the Internet. Additionally, the wireless link 102 can be used by the source 103 and the sink apparatus 100 to create a peer-to-peer link.

The de-multiplexer 113 conforms to an appropriate protocol and can be embodied in a microprocessors, digital signal processors (DSPs) or application specific integrated circuits (ASICs), for example.

The audio and video decoders 116, 120 are arranged to implement any number of audio and video decoding standards, such as MPEG-TS, for example. In some embodiments, the audio decoder 116 and video decoder 120 are integrated into one unit for decoding both audio and video data in a common data stream. Thus, although FIG. 1 shows channels carrying audio data and video data separately, it is to be understood that in some instances video data and audio data can be part of a common data stream. A process for rendering the decoded data is carried out in a conventional manner by the audio renderer 118 and video renderer 122. Typically, audio and video data are arranged in frames and the audio frames are synchronized with the video frames when rendered.

The illustrated components of the sink apparatus 100 form a processing pipeline for receiving modulated and encoded streamed multimedia data packets, demodulating and decoding the received packets and rendering the data for display to a user on the visual display device 105 and speaker 104.

The processing pipeline also includes various buffers, as mentioned above. For example, typically, a data frame update can be queued or accumulated in any of the buffers 112, 114, 115, 117, 121, 119, 123. In some examples, a known direct memory access operation can be used to retrieve frame updates held in a buffer and move them along the processing pipeline. Also, for example, data packets or frames may be temporarily stored in a buffer until a processing operation is completed in a subsequent processing module or, in another example, until an expected incoming data packet has arrived. The third video buffer 123, for example, can be thought of as a 'play out' buffer that counters jitter in the displayed video images. This is a deliberate increase in latency where a packet is not played out until the following one has been received in the buffer. In other cases, audio data may have to wait at a particular location in the processing pipeline while video data catches up. Thus, as mentioned above, buffering in the sink processing pipeline contributes to latency of the data link between source and sink. A slow progression of data through the buffers will result in a high latency which may be undesirable from the user's point of view.

Typically, a time stamp is applied (at the source end) to each audio and video packet or each video frame. The time stamp relates to a (source) 'system time' that can be used to synchronize video and audio data at the sink end and can typically comprise a sequential value. In one embodiment, at the source end, encoded audio and video data with time stamp information is packetized, multiplexed and transmitted as a MPEG-TS steam for reception by the sink apparatus 100. The monitor 110 is arranged to read the time stamp value of each data packet received at the sink end at several locations in the processing pipeline. In one embodiment, these locations are at the input and output of the packet receiver 109, at the input and output of the de-multiplexer 113, and at the output of the third audio and video buffers 119, 123 respectively. The difference in time stamp values between a data packet appearing at the output of the third audio and videos buffers 119, 123 and a data packet arriving at the packet receiver 109 provides an indication of the amount of data that is buffered in the processing pipeline comprising the packet receiver 109, de-multiplexer 113, decoders 116, 120, renderers 118, 122 and buffers 112, 114, 115, 117, 121, 119, 123, at any given point in time.

The monitor 110 is arranged to monitor timestamp values at various locations in the processing pipeline and determine differences in the monitored time stamp values that are indicative of the amount of data buffered in the monitored portions of the processing pipeline. The monitor 110 is also arranged to compare a determined time stamp difference with one or more threshold values and instruct the first audio and video buffers 114, 115 to drop multimedia data (by discarding one or more frames appearing at the output of the de-multiplexer, for example), depending on the comparison. A measured time stamp difference that is greater than a threshold means that more data than is necessary for maintaining an acceptable jitter-free playback has been buffered in the processing pipeline and so frames can be discarded without seriously affecting quality of the data played back to the user. Discarding frames also reduces latency that can enhance the user experience.

For example, in one embodiment, the monitor 110 monitors the status of the packet receiver 109, de-multiplexer 113 and media player pipeline buffer 114/115. The packet receiver buffer status is determined by checking the time stamp of the packets input to and output thereof. The de-multiplexer buffer status is determined by checking the time stamp of the demuxed audio/video stream that is buffered in the de-multiplexer 113. The media player pipeline buffer status is determined by checking the current media time (media player playing time) and the de-multiplexer output audio stream time stamp.

The monitor 110 is also arranged to receive an input on line 111 from the user, (by way of the touch screen 106) whereby the user can specify a drop frequency of multimedia data. The monitor 110 is arranged to increase or decrease a threshold value depending on the user's input in a manner to be described below with reference to FIG. 3.

The monitor 110 also, in certain circumstances, compares a time stamp difference against two threshold values and if the compared value falls between the two values, the monitor 110 instructs the appropriate components of the playback pipeline (comprising the decoders 116, 120, renderers 118, 122 and first, second and third buffers 114, 115, 117, 121, 119, 123) to increase the playback speed at the speaker 104. Specifically, the audio renderer 118 is instructed to play back audio data faster, thereby consuming audio data buffered in the processing pipeline faster.

Advantageously, the sink apparatus 100 can balance latency and quality, both of which can be influenced by user requirements. For example, a user can set a quality criterion (or multimedia drop frequency) such as discarding frames once every minute if a low latency is required or once every hour if a high quality is required. In one embodiment, in order to avoid video mosaicing, the threshold value for video data is set higher than that for audio data.

Figure 2:
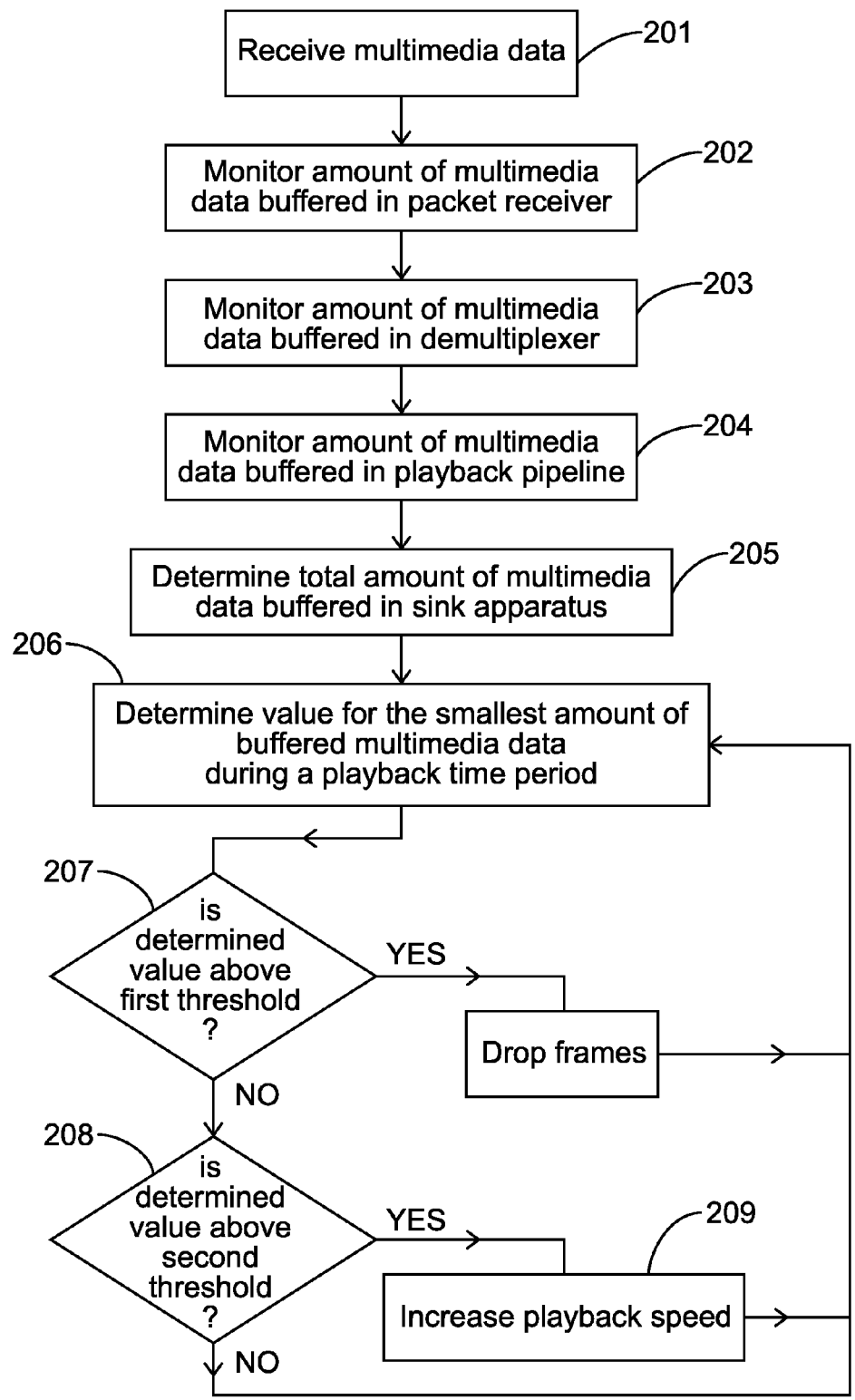
FIG. 2 is a simplified flow chart illustrating a method of operation of the sink apparatus of FIG. 1.

A method for operating the sink apparatus 100 of FIG. 1 will now be described with reference to the simplified flowchart of FIG. 2.

At 201, multimedia data is received at the packet receiver 109 and progresses through the stream buffer 112, the de-multiplexer 113 and the playback pipeline comprising the decoders 116, 120, renderers 118, 122 and buffers 114, 115, 117, 119, 121 and 123. Every time multimedia data is transferred from the de-multiplexer 113 to the first buffers 114, 115 in a fetch operation, the total amount of multimedia data (in terms of a time stamp difference) that is buffered in the sink apparatus 100 is calculated by the monitor 110. Over a playback period of some pre-chosen duration, say five seconds, the smallest calculated value for the buffered multimedia data is determined from the calculations. At 202, the monitor 110 determines the amount of multimedia data (in terms of a time stamp value difference) which is buffered in the packet receiver 109. The monitor 110 determines the amount of buffered multimedia data by obtaining the timestamps of data packets entering and leaving the packet receiver 109 and comparing the two values.

At 203 the monitor 110 also determines the amount of multimedia data (in terms of a time stamp value difference) that is buffered in the de-multiplexer 113. The monitor 110 determines the amount of buffered multimedia data by obtaining the timestamps of data packets entering and leaving the de-multiplexer 113 and comparing the two values.

At 204, the monitor 110 also determines the amount of multimedia data (in terms of a time stamp value difference) that is buffered in the playback pipeline. The monitor 110 determines the amount of buffered multimedia data by obtaining the timestamps of data packets entering the first audio and video buffers 114, 115 and leaving and arriving at the speaker 104 and visual display device 105 and comparing the two values.

At 205, the monitor determines the total amount of multimedia data buffered in the sink apparatus by summing the results of steps 202, 203 and 204.

At 206, the monitor 110 determines a value for the smallest amount of buffered media data (that is, the smallest measured timestamp difference value) that it has monitored in the preceding steps over the playback period.

At 207, the monitor 110 compares this smallest measured timestamp difference value with a preset first threshold value. If this smallest timestamp difference value is greater than the first threshold then media frames are dropped from the processing pipeline. Thus, latency will be reduced. For example, the first audio and video buffers will drop a buffered frame and send a subsequent buffered frame to their respective decoders 116, 120. The process reverts to step 206 where the value for the smallest amount of buffered multimedia data continues to be determined and compared with the first threshold. In one example, multimedia frames are discarded until the processing pipeline contains just sufficient media data to avoid underrun. This can typically comprise 50 ms worth of media data. Discarding frames in this way has the effect of reducing latency in the sink apparatus.

If, at 207, it is found that the smallest timestamp difference value is less than the first threshold, then at 208, a further comparison with a second threshold (lower than the first threshold) is made. If the comparison reveals that the smallest timestamp difference value is less than the second threshold then the method reverts to step 206 where the value for the smallest amount of buffered multimedia data continues to be determined and compared with the first threshold. If, on the other hand, the comparison reveals that the smallest timestamp difference value is greater than the second threshold, then at 209, the audio playback speed is increased. Increasing the audio playback speed has the effect of reducing latency by absorbing audio data faster.

Figure 3:
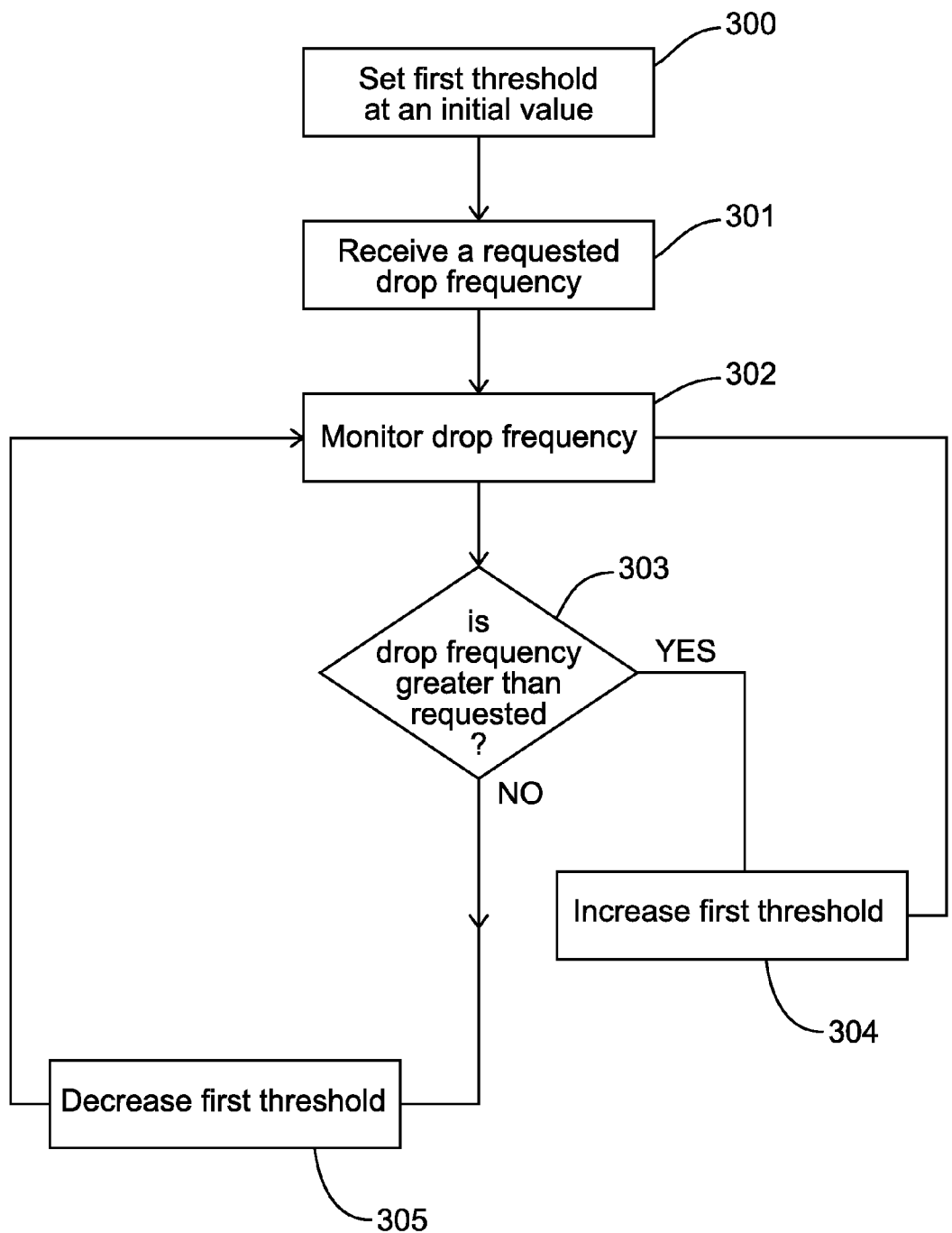
FIG. 3 is a simplified flow chart illustrating a further method of operation of the sink apparatus of FIG. 1.

A further method of operation of the sink apparatus 100 of FIG. 1 will now be described with reference to the simplified flowchart shown in FIG. 3.

At 300, the monitor 110 (See FIG. 1) sets the first threshold at an initial value.

At 301, a requested media drop frequency (say, one drop every five minutes) is received at the monitor 110 from the user. Such a request can be generated, for example, via the touchscreen 106 of the visual display device 105.

At 302, the monitor 110 monitors the frequency of media drops.

If, at 303, it is determined that the drop frequency is greater than that requested (for example, it is twice per five minutes) then at 304, the monitor increases the first threshold. Hence, the value of the first threshold increases if the user's requirement has not been satisfied. In such a situation the user needs better quality and can tolerate a greater latency. Subsequently, the process reverts to 302 where the drop frequency continues to be monitored, taking into account any further requests from the user.

If, on the other hand, at 303, it is determined that the drop frequency is no greater than that requested, then at 305, the monitor 110 decreases the value of the first threshold. In such instances, the user's requirement has been satisfied and the first threshold can be decreased because the user can tolerate more frequent media drops. The process reverts to 302 where the drop frequency continues to be monitored, taking into account any further requests from the user.

The invention may also be implemented in a computer program for running on a computer system, at least including code portions for performing steps of a method according to the invention when run on a programmable apparatus, such as a computer system or enabling a programmable apparatus to perform functions of a device or system according to the invention. As an example, a non-transitory computer-readable medium may be provided having computer-readable instructions stored thereon for performing a method for adjusting latency in a sink apparatus as disclosed herein. The non-transitory computer-readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between the functional blocks illustrated in FIG. 1 are merely illustrative and that alternative embodiments may merge functional blocks or circuit elements or impose an alternate decomposition of functionality upon various functional blocks or circuit elements. Thus, it is to be understood that the architectures depicted herein are merely exemplary, and that in fact many other architectures can be implemented which achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Further, the entire functionality of the modules comprising the sink apparatus shown in FIG. 1 (other than the loudspeaker and visual display) may be implemented in an integrated circuit. Such an integrated circuit may be a package containing one or more dies. Alternatively, the examples may be implemented as separate integrated circuits or separate devices interconnected with each other in a suitable manner. An integrated circuit device may comprise one or more dies in a single package with electronic components provided on the dies that form the modules and which are connectable to other components outside the package through suitable connections such as pins or leads of the package and bond wires between the pins and the dies.

Also for example, the examples, or portions thereof, may be implemented as soft or code representations of physical circuitry or of logical representations convertible into physical circuitry, such as in a hardware description language of any appropriate type. Furthermore, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems.'

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for adjusting latency in a sink apparatus, wherein the sink apparatus receives media data from a source apparatus for playing back on a display and includes a processing pipeline, the method comprising:
   monitoring an amount of media data buffered between two different locations in the processing pipeline by determining a difference of timestamp values, assigned to media data packets of the received media data, at the two different locations in the processing pipeline;
   comparing a monitored amount of media data with a predetermined threshold value;
   if the monitored amount of media data exceeds the predetermined threshold value, discarding media data from the processing pipeline until the monitored amount falls below the predetermined threshold value;
   comparing monitored amounts of buffered media data in the processing pipeline over a playback time period;
   determining a smallest value for an amount of the buffered media data that is smaller than other monitored amounts of buffered media data in the processing pipeline over the playback time period;
   comparing the determined smallest value with the predetermined threshold value; and
   if the determined smallest value exceeds the predetermined threshold value, discarding media data from the processing pipeline until the determined smallest value falls below the predetermined threshold.

2. The method of claim 1, further comprising measuring an amount of buffered media data over a fixed playback time period.

3. The method of claim 1, wherein discarding media data comprises dropping one or more frames of the media data.

4. The method of claim 1, further comprising comparing the monitored amount of media data with an upper threshold and a lower threshold, and increasing a playback speed of the received media data if the monitored amount has a value between the upper and lower thresholds.

5. The method of claim 1, further comprising varying the predetermined threshold value depending on a user requirement.

6. The method of claim 1, wherein the media data comprises audio and video data.

7. The method of claim 5, further comprising increasing the predetermined threshold value when a user requirement is not being satisfied.

8. The method of claim 5, further comprising decreasing the predetermined threshold value when a user requirement is being exceeded.

9. The method of claim 6, wherein the predetermined threshold value is higher for video data than for audio data.

10. A sink apparatus that receives media data from a source apparatus and plays back the received media data on a display, the sink apparatus comprising:
a processing pipeline; and
a monitor,
wherein the monitor:
monitors an amount of media data buffered between two different locations in the processing pipeline by determining a difference of timestamp values, assigned to media data packets comprising received media data, at the two different locations in the processing pipeline;
compares a monitored amount of media data with a predetermined threshold value;
if the monitored amount of media data exceeds the predetermined threshold value, discards media data from the processing pipeline until the monitored amount falls below the predetermined threshold value;
compares the monitored amounts of buffered media data in the processing pipeline over a playback time period;
determines a smallest value for an amount of buffered media data that is smaller than other monitored amounts of buffered media data in the processing pipeline over the playback time period;
compares the determined smallest value with the predetermined threshold value; and
if the determined smallest value exceeds the predetermined threshold value, discards media data from the processing pipeline until the determined smallest value falls below the predetermined threshold.

11. The sink apparatus of claim 10, wherein the monitor measures an amount of buffered media data over a fixed media playback time period.

12. The sink apparatus of claim 10, wherein the monitor discards media data by dropping one or more frames of media data.

13. The sink apparatus of claim 10, wherein the monitor compares the monitored amount of media data with an upper threshold and a lower threshold, and increases a playback speed of the received media data if the monitored amount of media data has a value lying between the upper and lower thresholds.

14. The sink apparatus of claim 10, further comprising an input means for inputting a user requirement, wherein the monitor, upon receipt of the user request, changes the predetermined threshold value.

* * * * *